United States Patent
Hedlund et al.

(10) Patent No.: US 10,399,404 B2
(45) Date of Patent: Sep. 3, 2019

(54) SUPPORT ROD FOR A MACHINE

(71) Applicant: Caterpillar Paving Products Inc., Brooklyn Park, MN (US)

(72) Inventors: Roger Allen Hedlund, Champlin, MN (US); Brad Green, Siler City, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 122 days.

(21) Appl. No.: 15/796,979

(22) Filed: Oct. 30, 2017

(65) Prior Publication Data

US 2019/0126710 A1   May 2, 2019

(51) Int. Cl.
| | | |
|---|---|---|
| *B60G 17/00* | (2006.01) | |
| *B62D 65/00* | (2006.01) | |
| *E01C 23/12* | (2006.01) | |
| *E01C 23/088* | (2006.01) | |
| *E01C 21/00* | (2006.01) | |

(52) U.S. Cl.
CPC ............. *B60G 17/00* (2013.01); *B62D 65/00* (2013.01); *E01C 21/00* (2013.01); *E01C 23/088* (2013.01); *E01C 23/127* (2013.01)

(58) Field of Classification Search
CPC ......... B60G 17/00; B62D 65/00; E01C 21/00; E01C 23/088; E01C 23/127
See application file for complete search history.

(56) References Cited

U.S. PATENT DOCUMENTS

| | | | |
|---|---|---|---|
| 3,720,435 A | 3/1973 | Leyn | |
| 6,224,840 B1 * | 5/2001 | Kim .................... | B01D 53/508 423/244.02 |
| 7,197,872 B2 | 4/2007 | Satake et al. | |
| 8,286,997 B2 | 10/2012 | Kimener et al. | |
| 2006/0185180 A1 * | 8/2006 | MacKelvie ............ | G01B 5/255 33/203.18 |
| 2018/0354471 A1 * | 12/2018 | Di Biase ................... | B60S 9/06 |

FOREIGN PATENT DOCUMENTS

| | | |
|---|---|---|
| DE | 202010009921 | 10/2011 |
| DE | 102012109792 | 4/2014 |
| JP | 3164287 | 3/2010 |

* cited by examiner

*Primary Examiner* — Darlene P Condra (57) ABSTRACT

A machine including a frame, a traction assembly and an actuator disposed between the frame and the traction assembly is disclosed. The actuator is configured to raise the frame to a serviceable height relative to the traction assembly. The machine further includes a support rod configured to be disposed between the frame and the traction assembly when the frame is at the serviceable height such that the support rod is magnetically held on one of the frame and the traction assembly and the support rod defines a gap with other of the frame and the traction assembly. The support rod is configured to abut the other of the frame and the traction assembly when a height of the frame relative to the traction assembly decreases to a height less than the serviceable height.

20 Claims, 9 Drawing Sheets

SUPPORT ROD FOR A MACHINE

TECHNICAL FIELD

The present disclosure generally relates to machines. More particularly, the present disclosure relates to support rods for machines.

BACKGROUND

Construction machines, such as reclaimer machines, stabilizer machines, cold-planer machines, etc., may include vertically adjustable legs. The vertically adjustable legs are configured to raise and lower a frame of the machine to perform a desired operation. During servicing of the machine, the legs are configured to extend and raise the frame of the machine so that an operator/technician can access machine components that lie underneath and/r on the lower portion of the frame.

Additionally, during servicing, safety stand-offs or support rods (i.e. support structures) may be disposed at specific locations proximal, to the vertically adjustable legs in order to prevent sudden lowering of the machine (in case of failure/buckling of the extended vertically adjustable legs). However, when the machine arrives for servicing a steering or traction assembly of the machine may be in varying orientations. This can make the process of locating the specific mounting positions for the stand-offs difficult and a time consuming task.

U.S. Pat. No. 8,286,997 is directed to supports utilized to secure freight trailers at a loading dock while dock personnel load and/or unload cargo from the freight trailers. U.S. Pat. No. 8,286,997 discloses that a portable trailer stabilizer is configured to be placed underneath a parked freight trailer at a loading dock such that the portable trailer stabilizer is located between the parked trailer and a ground surface.

SUMMARY OF THE INVENTION

In an aspect of the present disclosure, a machine is disclosed. The machine includes a frame, a traction assembly and an actuator disposed between the frame and the traction assembly. The actuator is configured to raise the frame to a serviceable height relative to the traction assembly. The machine further includes a support rod configured to be disposed between the frame and the traction assembly when the frame is at the serviceable height such that the support rod is magnetically held on one of the frame and the traction assembly and the support rod defines a gap with other of the frame and the traction assembly. The support rod is configured to abut the other of the frame and the traction assembly when a height of the frame relative to the traction assembly decreases to a height less than the serviceable height.

In another aspect of the present disclosure, a machine is disclosed. The machine includes a frame and a traction assembly having a steering plate. The steering plate is rotatable relative to the frame and includes a locator configured to indicate a rod mounting location on the steering plate. The machine further includes an actuator having a first actuator end and a second actuator end, the first actuator end coupled to the frame and the second actuator end coupled to the steering plate. The actuator is configured to extend and retract to raise the frame to a serviceable height relative to the steering plate. The machine also includes a support rod configured to be magnetically held on the rod mounting location on the steering plate when the frame is at the serviceable height such that a gap exists between the frame and the support rod. The support rod is configured to abut the frame, for any angular orientation of the steering plate relative to the frame, when a height of the frame relative to the traction assembly decreases to a height less than the serviceable height.

In yet another aspect of the present disclosure, a method for servicing a machine is disclosed. The machine includes a frame, a traction assembly having a steering plate rotatable relative to the frame and an actuator coupled to the steering plate at one end and the frame at an other end. The method includes raising, by the actuator, the frame relative to the traction assembly to a serviceable height and positioning a support rod between the frame and the steering plate such that the support rod is magnetically mounted on a rod mounting location provided on the steering plate and a gap exists between the support rod and the frame for any degree of rotation of the steering plate relative to the frame, wherein the support rod is configured to abut the frame when a height of the frame relative to the traction assembly decreases to a height less than the serviceable height.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
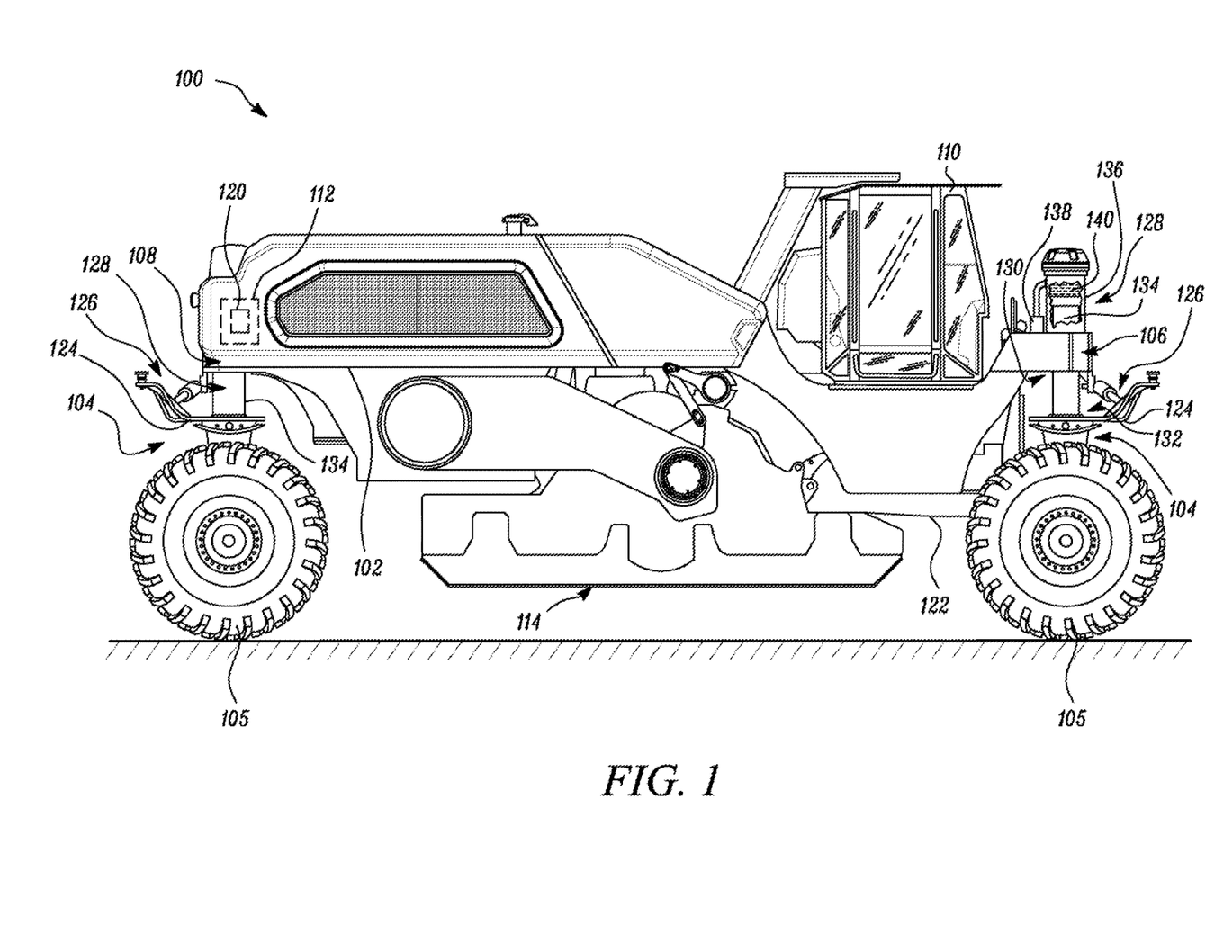
FIG. 1 illustrates a side-view of an exemplary machine having a frame and one or more traction assemblies, in accordance with an embodiment of the present disclosure.

Referring to FIG. 1, an exemplary machine 100 configured to operate at a worksite is illustrated. The worksite may include, for example road construction location, a mine site, a landfill, a quarry, other construction sites, or any other type of worksite. The machine 100 may be configured to engage with a work surface of the worksite and alter geographical features of the work surface. In the embodiment illustrated in FIG. 1, the machine 100 is a road reclaimer machine configured to pulverize asphalt present on the work surface and mix it with the underlying base to stabilize the work surface. However, in various other embodiments the machine 100 may be any other machine configured to alter the geography of the worksite by performing one of a dozing operation, a grading operation, a leveling operation, a bulk material removal operation, or any other type of operation that results in geographical modifications within the worksite.

The machine 100 includes a frame 102 and one or more traction assemblies (each traction assembly referred to by the reference numeral 104). The frame 102 includes a front end 106 and a rear end 108, and is configured to support various components/systems of the machine 100 such as, but not limited to, an operator cab 110, a power producing system 112, a milling system 11.4 and a transmission system (provided on a side of the machine 100 that extends into the plane of the paper and accordingly is not illustrated).

The operator cab 110 may be defined as an enclosure that may include one or more of electronic panels, displays, buttons, joysticks and various other physically actuable entities. Actuations of such entities, buttons, joysticks, etc. may actuate or move the one or more systems present in the machine 100.

The power producing system 112 may include a compartment having a power source 120 in the form of an engine or an electric motor that is configured to produce torque/power to operate various systems of the machine 100. In an embodiment, the power source 120 may be a diesel engine in various other embodiments, the power source 120 may be any engine running on solid, liquid or gaseous fuel. In the embodiment illustrated, the machine 100 includes one power source 120. However, it may be contemplated that in various other embodiments, the machine 100 may include more than one power source 120 configured to produce torque/power for operating various systems of the machine 100.

The milling system 114 may be disposed below the frame 102, and may be coupled to a bottom side 122 of the frame 102. In an embodiment, the milling system 114, at least partly, may be disposed between the power producing system 11.2 and the front end 106 of the frame 102 along a longitudinal direction of the machine 100, as shown in FIG. 1. The milling system 11.4 may include a milling chamber and a rotor disposed within the milling chamber. The rotor may include a plurality of cutting elements mounted on an outer periphery of a rotor drum to grind and/or pulverize the work surface. The rotor may be driven by a drive assembly which in turn may be driven by the power source 120. The drive assembly may include a chain sprocket arrangement to rotate the rotor. Although the chain sprocket arrangement is contemplated, it may be appreciated that the drive assembly may include a belt pully arrangement, a gear assembly, or any other suitable mechanism to transfer power from the power source 120 for rotating/driving the rotor.

The machine 100 includes the transmission system operatively coupled to the power source 120. The transmission system may include a hydraulic motor drawing torque from the power source 120 to drive a belt around one or more pullies. The belt-pulley arrangement of the transmission system may be coupled to each traction assembly 104. The one or more traction assemblies 104 may be configured to engage with the work surface and propel/move the machine 100 on the work surface when the transmission system draws torque from the power source 120 of the power producing system 112. While a hydraulic transmission system has been described, in various other implementations the transmission system may include one or more of motors, transmission shafts, gears, differential systems, axles, idlers and the like.

Each traction assembly 104 includes a traction unit 105. In the embodiment illustrated, the machine 100 includes four traction assemblies 104. More specifically, two traction units 105 are disposed at the front end 106 of the frame 102 (only one traction unit 105 is illustrated, however it may be contemplated that the other traction unit 105 is present on an other side of the machine 100 i.e. on the side that extends into the plane of the illustration). The remaining two traction units 105 are disposed at the rear end 108 of the frame 102, in a similar manner to the front two traction units 105. Although traction units 105 are depicted as wheels, it is to be understood that other devices, such as but not limited to tracks or the like may also be employed.

Figure 2:
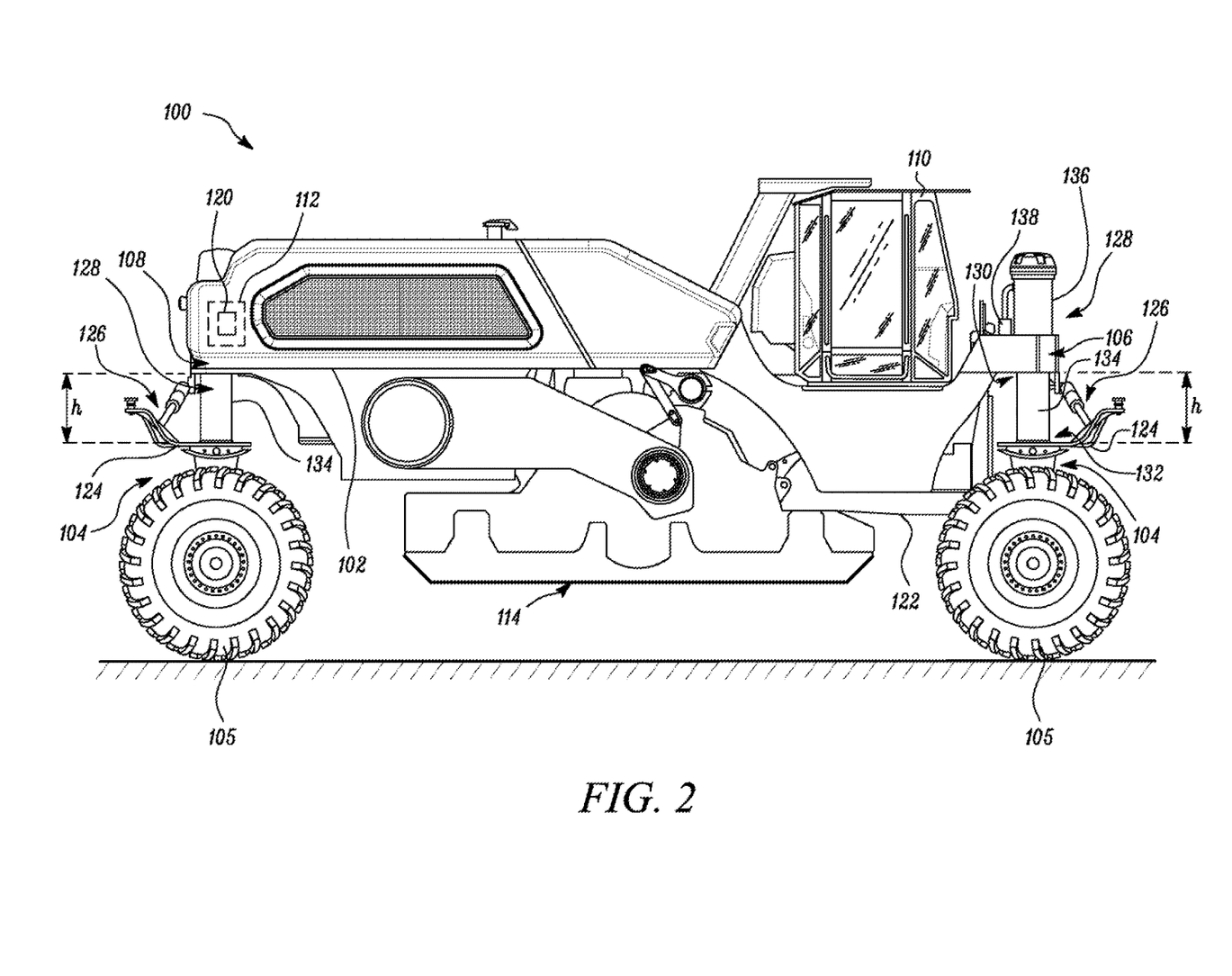
FIG. 2 illustrates the frame of the machine raised to a serviceable height relative to the one or more traction assemblies, in accordance with an embodiment of the present disclosure.
Figure 3:
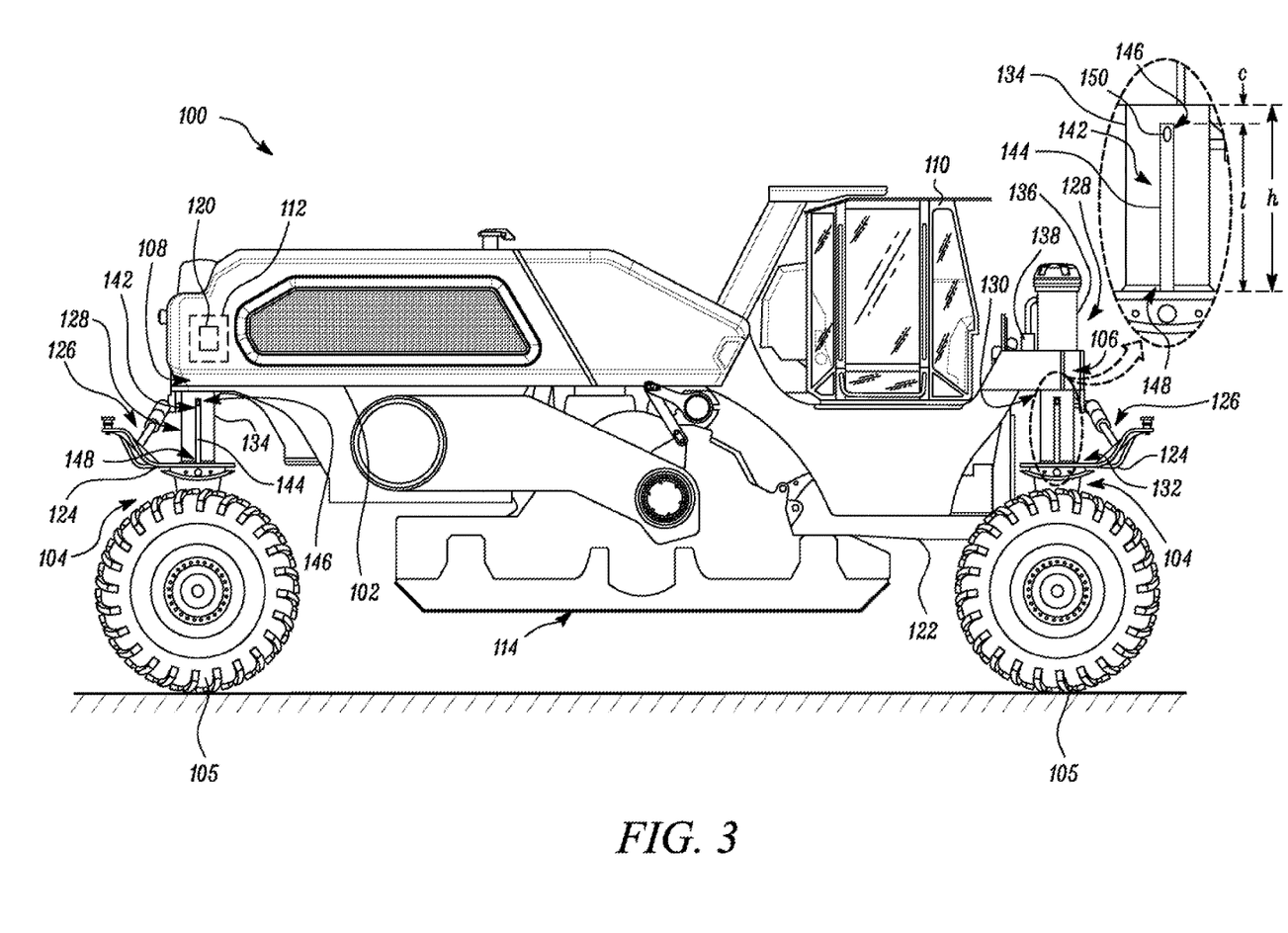
FIG. 3 illustrates the machine having a plurality of support rods disposed between the frame and the one or more traction assemblies, in accordance with an embodiment of the present disclosure.

As illustrated in FIG. 1, FIG. 2 and FIG. 3, each traction assembly 104 includes a steering plate 124 rotatable relative to the frame 102. The steering plate 124 is coupled to the traction unit 105 at one end and is coupled to a steering system 126 of the machine 100 at an other end. The steering system 126 facilitates a rotational motion of the steering plate 124 relative to the frame 102. Such rotational motion of the steering plate 124 translates into a turning of the traction unit 105 and aids in maneuvering the machine 100 to different sites on the worksite. Further, such rotational motion aids in steering the machine 100 during a processing/reclaiming operation (i.e. when the machine 100 is making a cut and pulverizing the material that is cut from the work surface).

The machine 100 further includes a plurality of actuators (each actuator being referred by the reference numeral 128). Each actuator 128 couples the frame 102 to one of the traction assemblies 104. Each actuator 128 includes a first actuator end 130 and a second actuator end 132. The first actuator end 130 is coupled to the frame 102 and the second actuator end 132 is coupled to one of the steering plate 124 of the traction assembly(ies) 104. Each actuator 128 is configured to extend and retract to raise and lower at least a portion of the frame 102 relative to the traction assembly(ies) 104.

In the embodiment illustrated, each actuator 128 includes a push rod 134, a cylinder 136 and a hydraulic feed system 138. The cylinder 136 is configured to at least partially receive the push rod 134 and define a variable volume enclosure 140. The variable volume enclosure 140 is configured to receive hydraulic fluid via the hydraulic feed system 138. The hydraulic feed system 138 is configured to control an amount and/or pressure of the hydraulic fluid present in the variable volume enclosure 140, thereby adjusting the height of the frame 102 relative to the plurality of traction assemblies 104. For example, the hydraulic feed system 138 may inject high pressure hydraulic fluid into the variable volume enclosure 140. This may push a piston of the push rod 134 and force the push rod 134 to extend out of the cylinder 136, facilitating an increase in the height of the frame 12 relative to the plurality of traction assemblies 104 (as can be seen on a comparison of FIG. 1 and FIG. 2).

Figure 4:
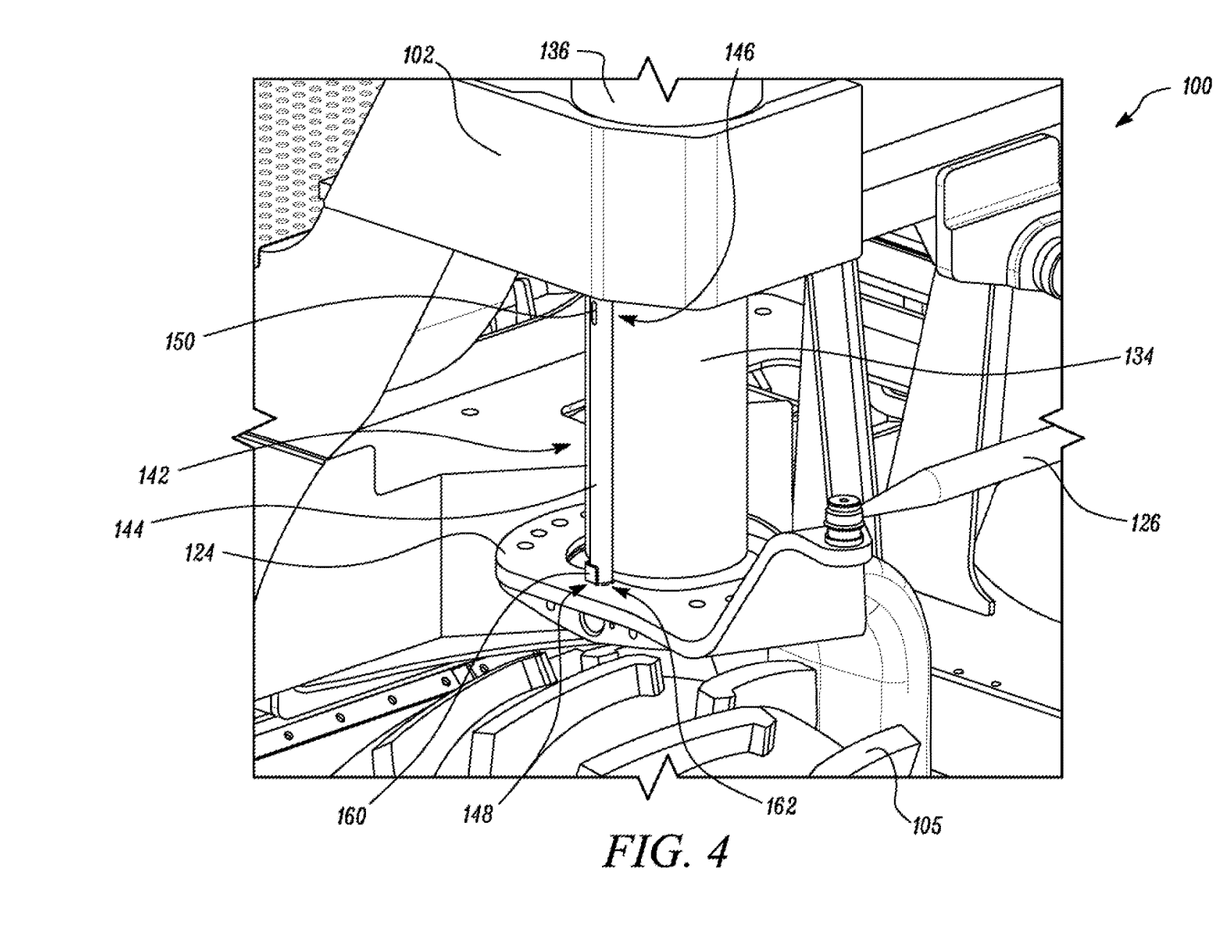
FIG. 4 is a perspective view of a portion of the machine illustrated in FIG. 3, where a single support rod is disposed between the frame and one traction assembly.
Figure 8:
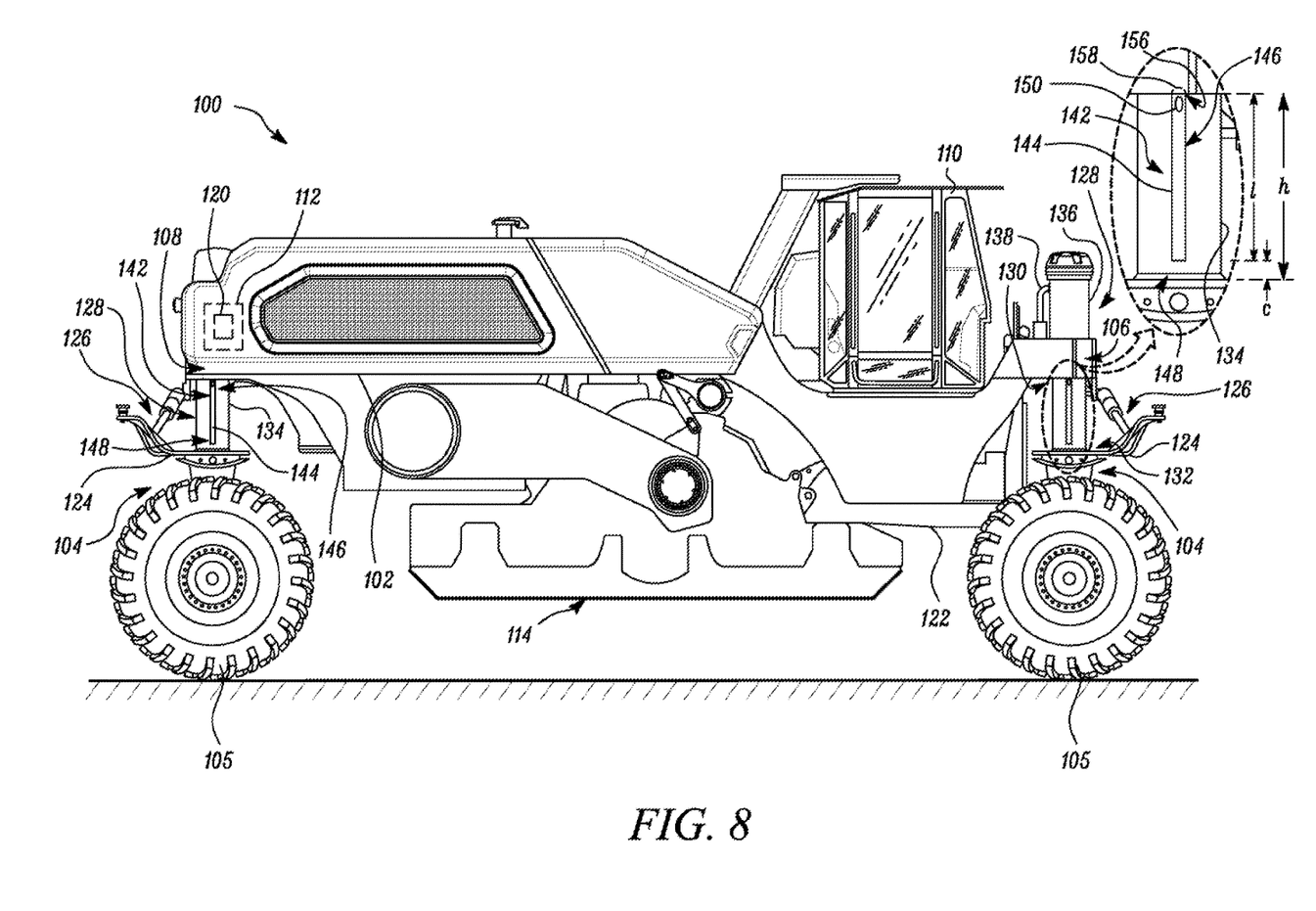
FIG. 8 illustrates the machine having a plurality of support rods disposed between the frame and the one or more traction assemblies, in accordance with an alternate embodiment of the present disclosure.

Referring to FIG. 3, FIG. 4 and FIG. 8, the machine 100 further includes a servicing system 142. The servicing system 142 includes one or more support rods (each support rod referred to by the reference numeral 144) configured to be disposed between the frame 102 and the traction assembly(ies) 104 (more specifically between the frame 102 and the steering plate 124 of one the traction assembly(ies) 104)

after the frame 102 is raised to a predetermined serviceable height 'h' relative to the traction assembly(ies) 104, as illustrated in FIG. 2 and FIG. 3. Each support rod 144 may be an elongated solid structure having a polygonal cross section. Each support rod 144 includes a first end 146 and a second end 148 defining a length 'l' of the support rod 144 therebetween (length 'l' being less than serviceable height 'h'). Each support rod 144 may further include a slot 150 proximal to the first end 146. Each support rod 144 may be composed of various metals such as, but not limited to, Inconel, high-carbon steel, low carbon steel, high strength steel.

Subsequent to the frame 102 being raised to the serviceable height 'h' relative to the traction assembly(ies) 104 (as illustrated in FIG. 2), the support rod 144 is configured to be placed between the frame 102 and one of the traction assemblies 104 such that one of the first end 146 and the second end 148 of the support rod 144 is magnetically held on one of the frame 102 and the one of the traction assemblies 104 (as illustrated in FIG. 3 and FIG. 8). Further, the end of the support rod 144 that is not magnetically coupled, as disclosed above, is configured to define a gap 'c' (in the form of a clearance) with other of the frame 102 and the one of the traction assemblies 104. In such a configuration, the support rod 144 is configured to abut the other of the frame 102 and the one of the traction assemblies 104 when a height of the frame 102 relative to the one of the traction assemblies 104 decreases to a height less than the serviceable height 'h'.

Figure 6:
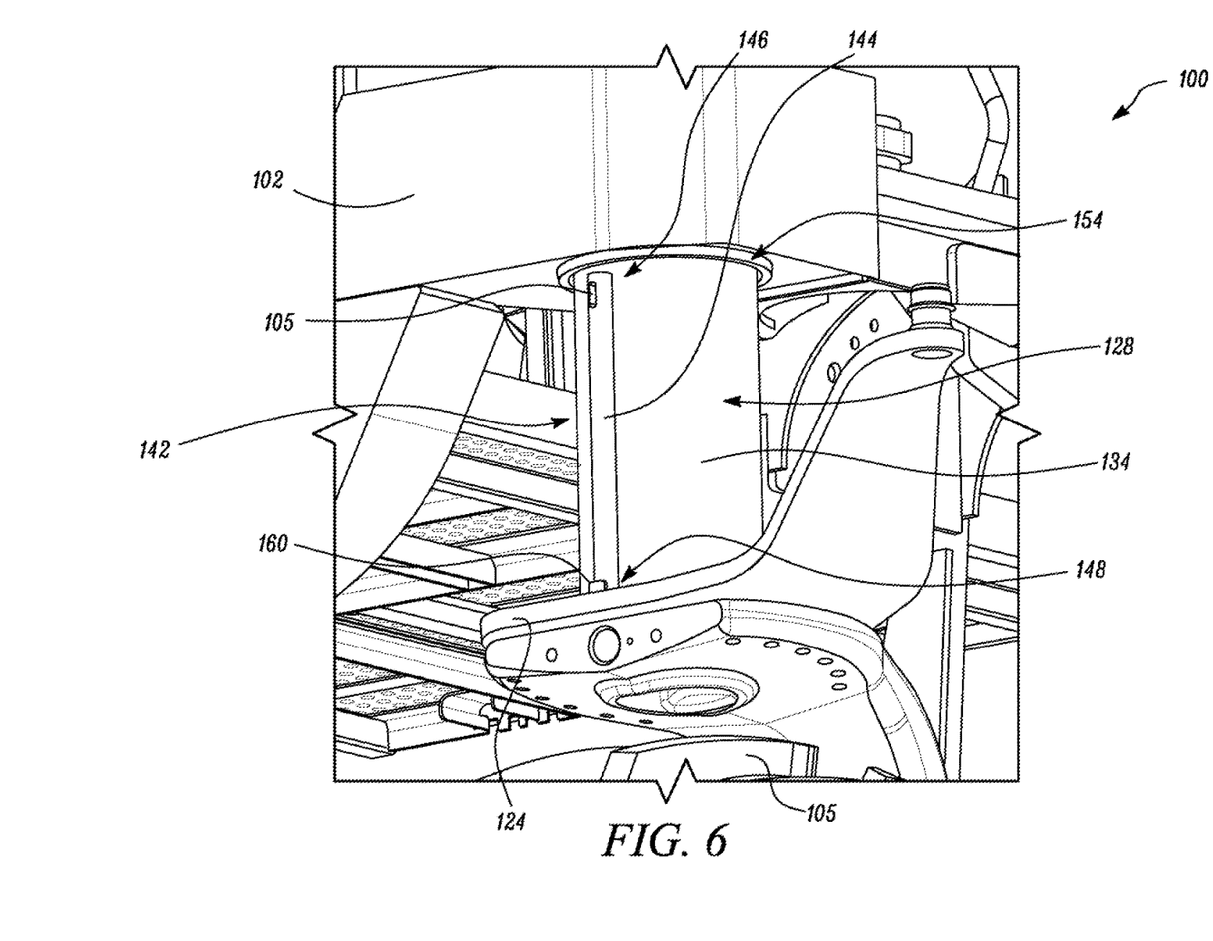
FIG. 6 illustrates another perspective view of the portion of the machine illustrated in FIG. 3, where the single support rod is disposed between the frame and one traction assembly.

For the purpose of better understanding, the two possible scenarios will now be explained in detail with reference to FIG. 3 to FIG. 8. In one scenario as illustrated in FIG. 3, FIG. 4 and FIG. 6, the second end 148 of the support rod 144 is configured to be magnetically held on the steering plate 124 when the frame 102 is at the serviceable height 'h'. As disclosed above, the length 'l' of the support rod 144 is less than the serviceable height 'h'. Thus, when the second end 148 of the support rod 144 is magnetically coupled on the steering plate 124 the gap 'c' exists between the frame 102 and the first end 146 of the support rod 144 (best illustrated in FIG. 3).

In the embodiment illustrated in FIG. 4 and FIG. 6, the steering plate 124 includes a locator 160 and a rod mounting location 162. The locator 160 is configured to indicate the rod mounting location 162 on the steering plate 124 i.e. the location on the steering plate 124 where the support rod 144 is configured to be coupled/connected/mounted. In the embodiment illustrated, the locator 160 is a L-shaped bracket disposed adjacent the rod mounting location 162. The presence of the L-shaped locator 160 provides a visual indication pertaining to the rod mounting location 162, thereby assisting an operator in placing the support rod 144 on the steering plate 124. While the locator 160 is embodied as L-shaped bracket in the illustrations, in various other embodiments, the locator 160 may be embodied in the form of other shaped brackets, etched marks, around the rod mounting location 162.

In an embodiment, the steering plate 124 may be made of any metal, such as, but not limited to, cast steel, high-strength steel. Inconel and the locator 160 may be welded adjacent to the rod mounting location 162 on the steering plate 124. In an embodiment, the steering plate 124 may be made up of cast ductile steel and a position where the locator 160 is to be welded may be machined to form features in the form of grooves, etched marks and the like. Such features may assist in indicating the position where the locator 160 is to be welded. In another embodiment, the steering plate 124 and the locator 16) may fabricated as a single component using a ductile metal, such as ductile steel, and a casting process. In various other embodiments, the locator 160 and the steering plate 124 may be fabricated using other techniques such as additive manufacturing and the like as an integral component/separate components.

Figure 5:
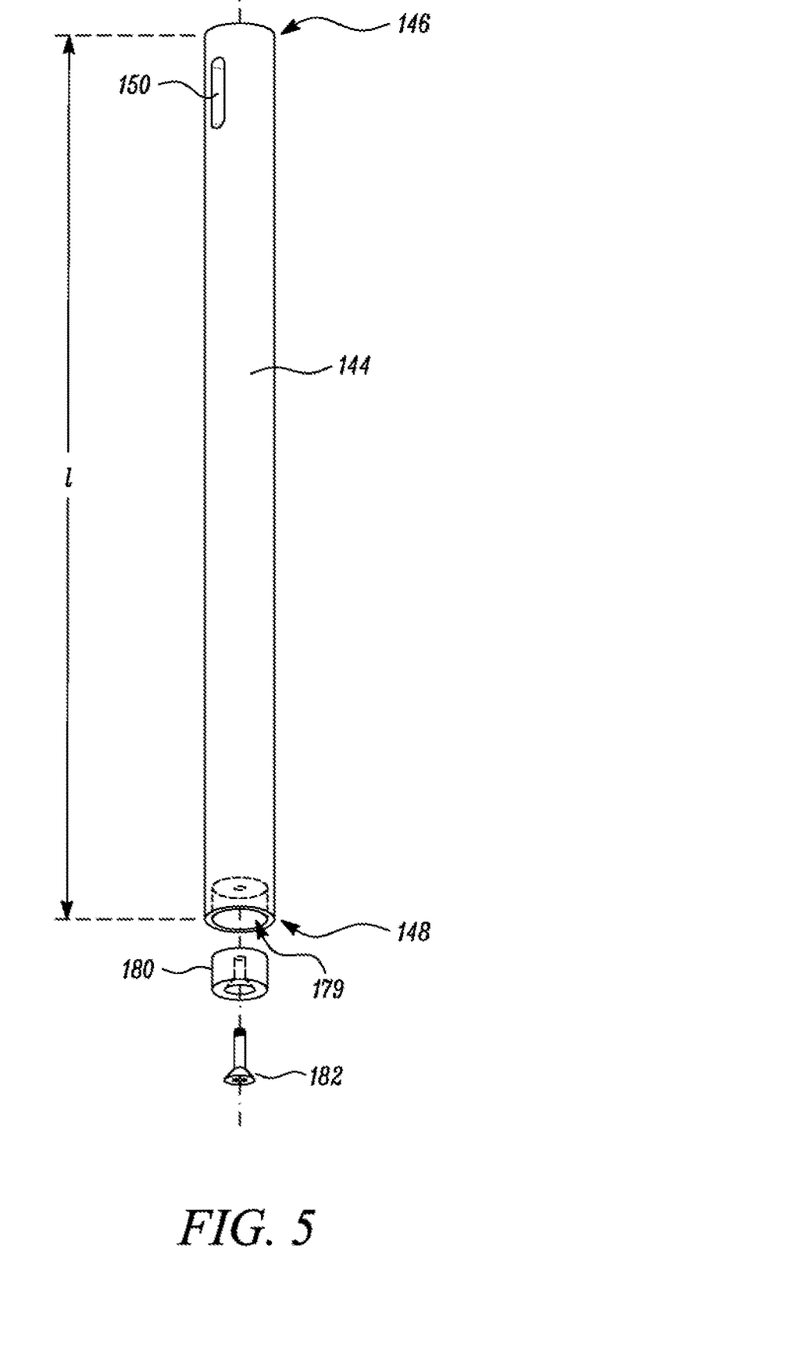
FIG. 5 illustrates the support rod implemented in FIG. 3, in accordance with an embodiment of the present disclosure.

The rod mounting location 162 on the steering plate 124 is provided proximal to the actuator 128. Accordingly, when the support rod 144 is placed on the steering plate 124 on the rod mounting location 162, the support rod 144 is configured to be disposed proximal to the actuator 128. In an embodiment, the rod mounting location 162 is a magnetic portion on the steering plate 124, a portion that exhibits magnetic properties to magnetically retain/hold the second end 148 of the support rod 144 (when placed on the rod mounting location 162). In an alternate embodiment, the rod mounting location 162 on the steering plate 124 may include one or more permanent magnets configured to magnetically retain the support rod 144 on the steering plate 124. In yet another embodiment, the second end 148 of the support rod 144 may exhibit magnetic properties and may be configured to hold itself magnetically when disposed on the on the rod mounting location 162 of the steering plate 124. In yet another embodiment, as illustrated in FIG. 5, the support rod 144 may include a hollow portion 179 that receives a permanent magnet 180. The permanent magnet 180 may be coupled to the second end 148 of the support rod 144 by using a fastener 182 (which may be a screw, bolt, rivet, etc.). The permanent magnet 180 may be configured to magnetically retain the support rod 144 when the support rod 144 is disposed on the on the rod mounting location 162 of the steering plate 124.

In the embodiment illustrated in FIG. 6, a portion 154 (embodied in the form of a circular rim in the illustrations) of the frame 102 present vertically above the steering plate 124 is designed such that the portion 154 of the frame 102 lies directly above the rod mounting location 162 for any angular orientation of the steering plate 124 relative to the frame 102. Such designing of the frame 102 ensures that when the support rod 144 is installed on the rod mounting location 162, the support rod 144 is configured to abut the frame 102 (more specifically the portion 154) for any angular orientation of the traction assembly 104 relative to the frame 102.

In an alternate scenario as illustrated in FIG. 8, the first end 146 is configured to be magnetically retained on the frame 102 when the frame 102 is at the serviceable height 'h' relative to the traction assembly 104. Since the length 'l' of the support rod 144 is less than the serviceable height 'h', when the first end 146 is magnetically held on the frame 102 the gap 'c' (equivalent to 'h-l') exists between the steering plate 124 and the second end 148 of the support rod 144.

In the embodiment illustrated in FIG. 8, the support rod 144 is configured to be magnetically retained at a specific location 156 on the frame 102 (the specific location 156 being proximal to the actuator 128). The steering plate 124 present below the specific location 156 is designed such that for any angular orientation of the steering plate 124 relative to the frame 102 there exists a portion of the steering plate 124 that lies directly below the specific location 156. Therefore, if the height of the frame 102 drops to a value less than the value of the serviceable height 'h', the support rod 144 is configured to abut the portion of the steering plate 124 that lies directly below the specific location 156 for any angular orientation of the traction assembly 104 relative to the frame 102.

The frame 102 may include a magnetic assembly 158 having one or more magnets configured to magnetically retain/hold the first end 146 of the support rod 144 on the frame 102. In an alternate embodiment, the first end 146 of the support rod 144 may exhibit magnetic properties and may be configured to utilize such magnetic properties to hold itself on the frame 102.

Figure 7:
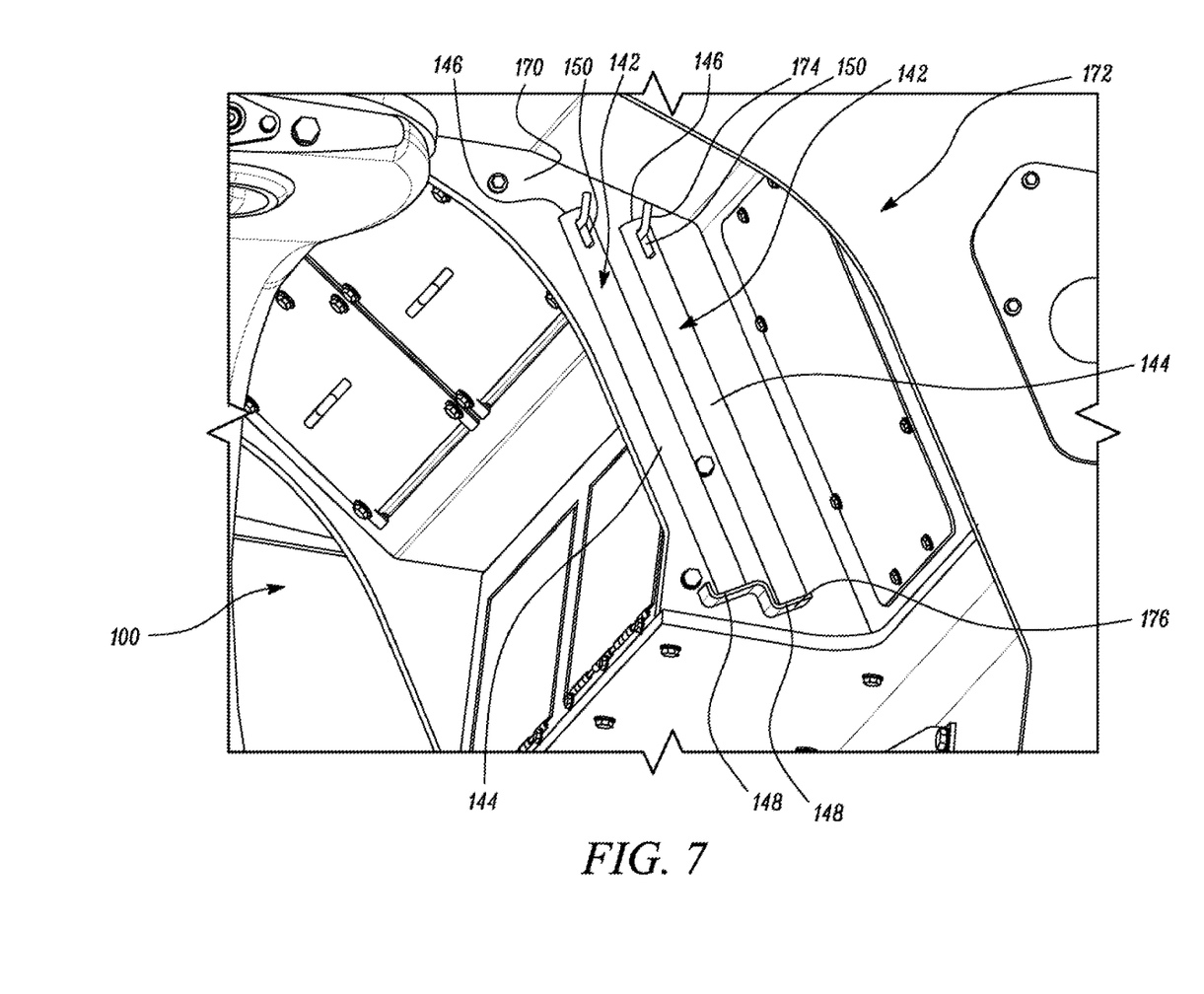
FIG. 7 is a perspective view of a portion of the machine illustrated in FIG. 1, illustrating a rod storage system, in accordance with an embodiment of the present disclosure.

In an embodiment as illustrated in FIG. 7 after completion of an operation that utilizes the support rods 144, the support rods 144 may be stored via a rod storage system 172 provided on a side surface 170 of the machine 100. The rod storage system 172 may include one or more hooks 174 configured to engage the slots 150 of the support rods 144. Further, the rod storage system 172 may include a magnetic base structure 176 (embodied as Z plate shaped structures) configured to magnetically hold the second end(s) 148 of the support rod(s) 144.

INDUSTRIAL APPLICABILITY

Machines, such as reclaimer machines, cold-planer machines, etc., may include vertically adjustable legs configured to raise the frame of the machine so that an operator/technician can access machine components that lie underneath and/or on the lower portion of the frame. During servicing, safety stand-offs (i.e. support structures) may be disposed at specific locations proximal to the vertically adjustable legs in order to prevent sudden lowering of the machine (in case of failure/buckling of the extended vertically adjustable legs). However, the machine arrives for servicing with varying steering orientations of traction assembly of the machine. The varying orientations make the process of locating the specific mounting positions for the stand-offs difficult and a time consuming task.

Figure 9:
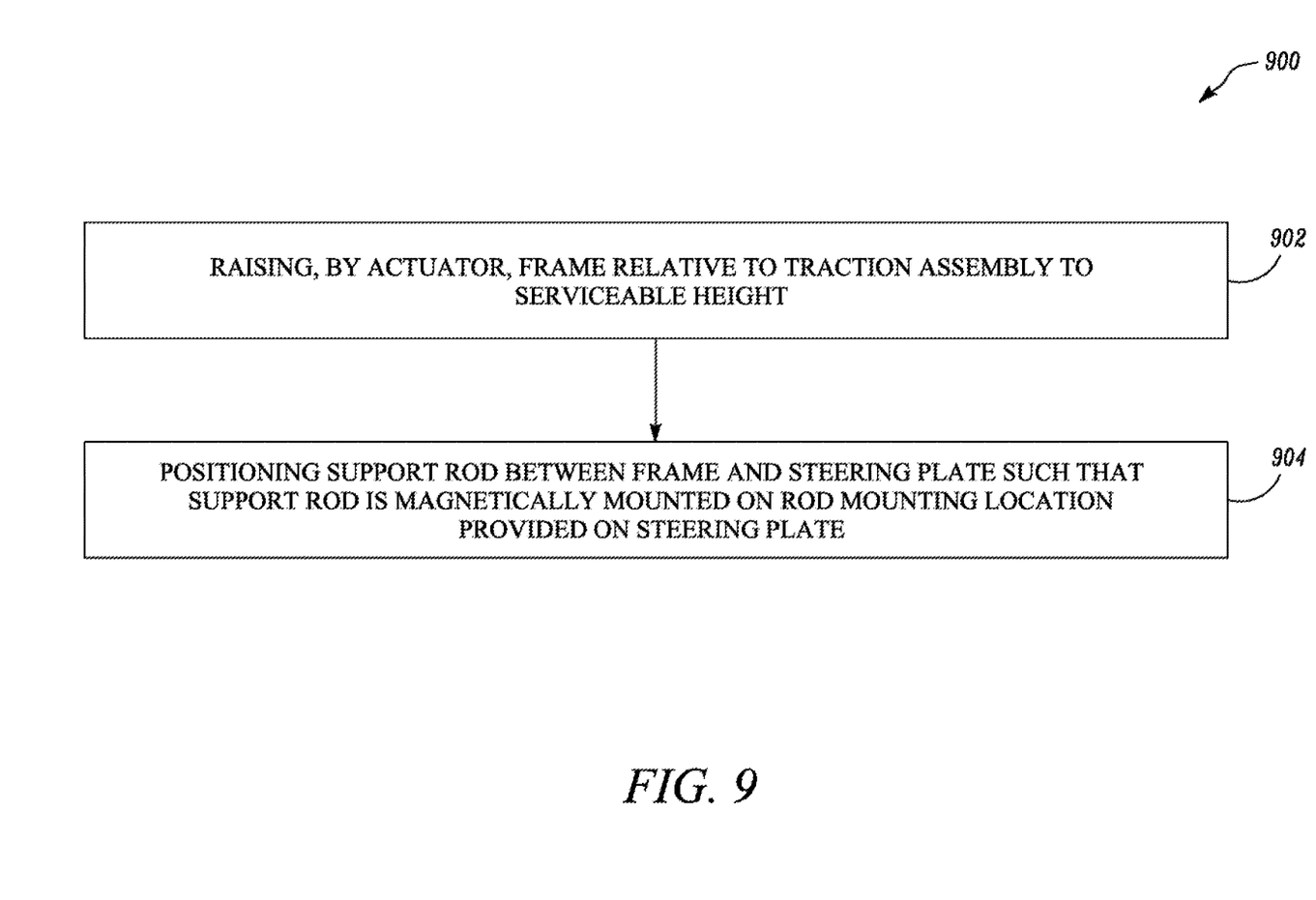
FIG. 9 depicts a method for servicing the machine in accordance with an embodiment of the present disclosure.

In an aspect of the present disclosure, a method 9040 for servicing the machine 100 is disclosed. The method 900 includes raising, by the actuator 128, the frame 102 relative to the traction assembly(ies) 104 to the serviceable height 'h', as shown in FIG. 2 (Step 902). The method 900 further includes positioning the support rod 144 between the frame 102 and the steering plate 124 such that the support rod 144 is magnetically mounted on the rod mounting location 162 provided on the steering plate 124 (Step 904), as shown in FIG. 3. Since the length 'l' of the support rod 144 is less than the serviceable height 'h', when the second end 148 is magnetically held on the steering plate 124 the gap 'c' exists between the frame 102 and the first end 146 of the support rod 144.

Further, since the portion 154 of the frame 102 lies directly above the rod mounting location 162 for any angular orientation of the steering plate 124 relative to the frame 102, the support rod 144 is configured to abut the frame 102 when a height of the frame 102 relative to the traction assembly 104 decreases to a height less than the serviceable height 'h'.

Utilization of the rod mounting location 162, the designing of the steering plate 124 and the portion 154 of the frame 102 and the method 900 as disclosed above, the need for locating the specific mounting positions for stand-offs and/or support rods 144 is obviated. Thereby, saving time and simplifying the process of servicing. Such aspects of the present disclosure help in saving valuable time of skilled employees and technicians. This time may be used to enhance other aspects of the service operations, assisting in improving productivity.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine comprising:
    a frame;
    a traction assembly;
    an actuator disposed between the frame and the traction assembly, the actuator configured to raise the frame to a serviceable height relative to the traction assembly; and
    a support rod configured to be disposed between the frame and the traction assembly when the frame is at the serviceable height such that:
        the support rod is magnetically held on one of the frame and the traction assembly; and
        the support rod defines a gap with other of the frame and the traction assembly,
    wherein the support rod is configured to abut the other of the frame and the traction assembly when a height of the frame relative to the traction assembly decreases to a height less than the serviceable height.

2. The machine of claim 1, wherein the support rod is configured to abut the other of the frame and the traction assembly for any angular orientation of the traction assembly relative to the frame.

3. The machine of claim 1, wherein the support rod is configured to be magnetically mounted on one of the frame a id the traction assembly such that the support rod is disposed proximal to the actuator.

4. The machine of claim 1, wherein
    one of the frame and the traction assembly includes a magnetic assembly configured to magnetically hold the support rod; and
    the magnetic assembly includes one or more permanent magnets.

5. The machine of claim 1, wherein the support rod is magnetically mounted on the traction assembly and the support rod defines the gap relative to the frame.

6. The machine of claim 5, wherein
    the traction assembly has a magnetic portion and a locator indicating the magnetic portion on the traction assembly; and
    the support rod is configured to be magnetically mounted on the magnetic portion of the traction assembly.

7. The machine of claim 6, wherein the locator is a L-shaped structure provided adjacent to the magnetic portion on the traction assembly.

8. The machine of claim 1, wherein the support rod includes a first end, a second end, and a slot proximal to the first end.

9. The machine of claim 8, further comprising a rod storage system provided on a side surface of the machine, the rod storage system including:
    a hook configured to engage the slot of the support rod; and
    a magnetic base structure configured to magnetically hold the second end of the support rod.

10. The machine of claim 1, wherein
    the support rod includes a first end that exhibits magnetic properties, and
    the first end is configured to be magnetically mounted on either the frame or the traction assembly.

11. A machine comprising:
    a frame;

a traction assembly including a steering plate, the steering plate rotatable relative to the frame and having a locator configured to indicate a rod mounting location on the steering plate;

an actuator having a first actuator end and a second actuator end, the first actuator end coupled to the frame and the second actuator end coupled to the steering plate, the actuator configured to extend and retract to raise the frame to a serviceable height relative to the steering plate; and a support rod configured to be magnetically held on the rod mounting location on the steering plate when the frame is at the serviceable height such that a gap exists between the frame and the support rod, wherein the support rod is configured to abut the frame, for any angular orientation of the steering plate relative to the frame, when a height of the frame relative to the traction assembly decreases to a height less than the serviceable height.

12. The machine of claim 11, wherein the rod mounting location is a magnetic portion on the steering plate.

13. The machine of claim 12, wherein the rod mounting location on the steering plate lies proximal to the actuator.

14. The machine of claim 12, wherein the locator is a L-shaped structure provided adjacent to the magnetic portion on the steering plate.

15. The machine of claim 11, wherein the support rod is a solid elongated structure having a polygonal cross section.

16. The machine of claim 11, wherein the support rod has a first end, a second end, and a slot proximal to the first end.

17. The machine of claim 16, further comprising a support rod storage system provided on a side surface of the machine, the support rod storage system including:

a hook configured to engage the slot of the support rod; and a magnetic base structure configured to magnetically hold the second end of the support rod.

18. The machine of claim 11, wherein the rod mounting location on the steering plate includes one or more permanent magnets configured to magnetically retain the support rod on the rod mounting location of the steering plate.

19. The machine of claim 11, wherein the support rod includes a first end that exhibits magnetic properties, and the first end is configured to be magnetically mounted on the steering plate.

20. A method for servicing a machine, the machine including a frame, a traction assembly having a steering plate rotatable relative to the frame and an actuator coupled to the steering plate at one end and the frame at an other end, the method comprising:

raising, by the actuator, the frame relative to the traction assembly to a serviceable height;

positioning a support rod between the frame and the steering plate such that the support rod is magnetically mounted on a rod mounting location provided on the steering plate and a gap exists between the support rod and the frame for any degree of rotation of the steering plate relative to the frame, wherein the support rod is configured to abut the frame when a height of the frame relative to the traction assembly decreases to a height less than the serviceable height.

* * * * *